J. McDERMOTT.

Thill-Coupling.

No. 52,586. Patented Feb. 13, 1866.

Witnesses

Inventor

UNITED STATES PATENT OFFICE.

JOHN McDERMOTT, OF WASHINGTON, DISTRICT OF COLUMBIA.

IMPROVEMENT IN THILL-COUPLINGS.

Specification forming part of Letters Patent No. 52,586, dated February 13, 1866.

*To all whom it may concern:*

Be it known that I, JOHN McDERMOTT, of the city of Washington, in the District of Columbia, have invented certain new and useful Improvements in Couplings for Uniting the Thills or Shafts of Wagons to the Axles Thereof; and I do hereby declare the following to be a full, clear, and exact description of the same, reference being had to the annexed drawings, making part of this specification, in which—

Figure 1:
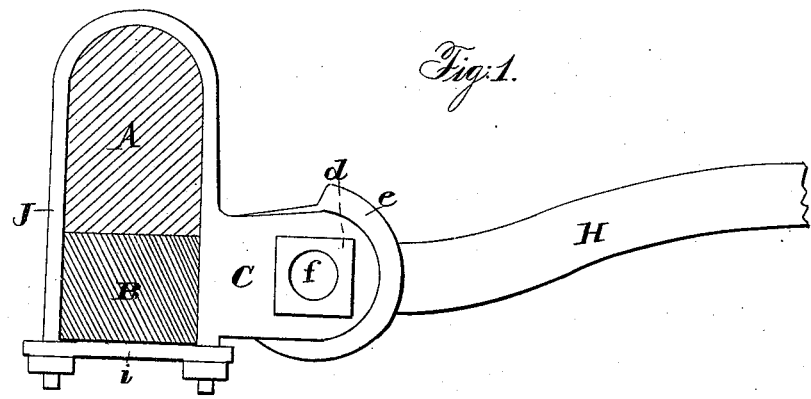
Figure 2:
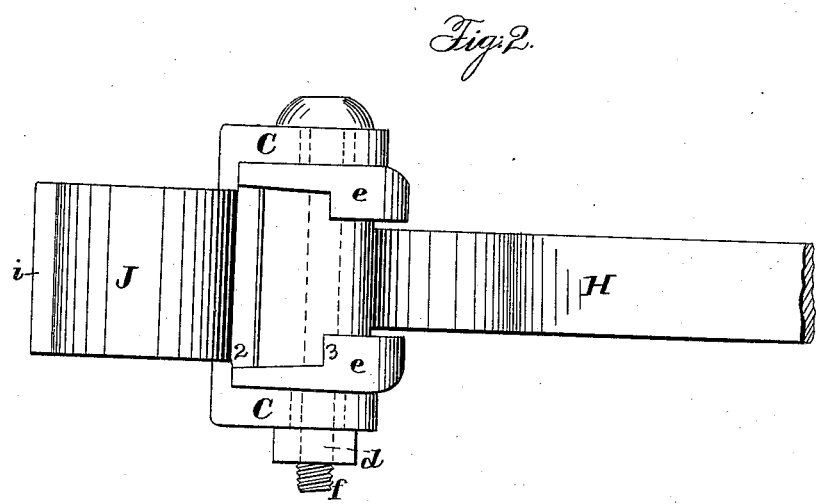
Figure 3:
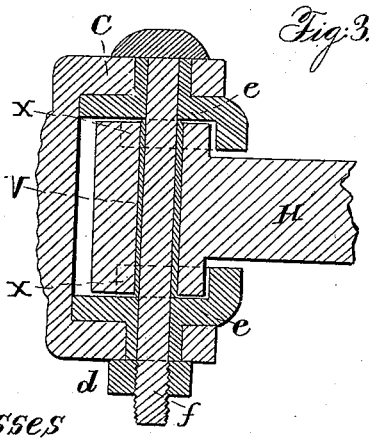
Figure 4:
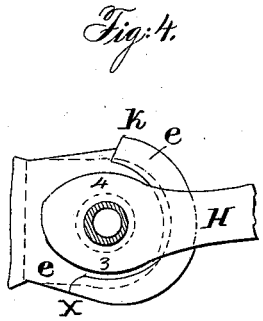

Figure 1 shows a side elevation of the coupling and a cross-section of the axle-tree. Fig. 2 is a top view of said coupling with the ends of the shafts or thills united thereto. Fig. 3 is a horizontal section through said coupling and the end of the thill; and Fig. 4 is a side view of the end of the thill and of a part of the coupling to be hereinafter explained.

Various methods have been proposed of uniting wagon-thills to the axle-tree for the purpose of securing greater durability and safety in this part of the wagon. The ordinary method of coupling the shafts to the axles is by the use of a pair of plain jaws, as shown by C, forged on a strap, J, passed around the axle and secured by a clamp, I, as shown in Fig. 1, with the ends of the shaft introduced in the jaw and secured by a bolt passed through corresponding holes made in the jaws and the ends of the thills. This is the method now almost universally adopted to unite these parts of a wagon; but the method is defective on account of the constant and rapid wear on the bolt-lugs and end of the thills, occasioned by the sand and dirt always present when the wagon is in use, and which soon cuts out the bolt-holes in the jaws and ends of the thills and wears off the bolt, making the coupling rattle and liable to break, and, moreover, the bolt sometimes works out of the coupling altogether, leaving the thills to fall down upon the heels of the horse, thus giving rise to serious accidents and sometimes to loss of life.

To cure these imperfections—these defects in this kind of coupling—is the object of this invention, which object I accomplish by first making the ordinary lug, consisting of the jaws C C and strap J, provided with the usual bolt. The holes in the jaws, however, I make something larger than the bolt, and in the inside of the jaws I introduce a bushing or facing, *e*, composed of some good anti-friction metal or substance—brass, for example. This bushing is made with a tubular projection or socket on its outside surface in the manner shown. Upon the inside surfaces of these bushings, and upon the front edge thereof, a flange or projection is raised, reaching inward and over the shoulder forged on the ends of the thill. The lower end, *x*, of this flange reaches back under the shoulder of the thill-shank bolt-hole, leaving an opening between it and the back part of the lug, that the dirt may fall through instead of working in between the flange and the shoulder, in the manner shown in Fig. 4 and in dotted lines by *x*, Fig. 3. The upper end, K, of this flange does not reach so far back as between it and the back face of the lug—that is, between the points 2 and 3 there is a space equal to the thickness of the thill-shank across its minor diameter, or from 3 to 4. The thill-shank is represented in the drawings by H, and the head of it is made oval or oblong, as shown in Fig. 4, so that when the shafts are raised up the head will slip through the opening between the upper end of the flange and the back face of the lug—that is, between the points 2 and 3—and when the shafts are again lowered to their usual horizontal position they fall in the box formed by the flanges on the bushings, the shank-head thus acting as a key to hold the bushings in their place, and the flanges on the bushings act as a shackle to hold the shanks of the thills, so that in case the bolt should work out the thill-shanks could not get out of the coupling, which thus forms a complete safeguard against accident from this cause. The hole through the shank-head is also lined with some approved anti-friction metal, and the shoulders on the shanks of the thills should be so proportioned with respect to the flanges and the bolt-hole as to cause them to bear against said flanges when the bolt is in its place, thus increasing the extent of the rubbing-surface.

This invention, it will be seen, accomplishes two objects—first, greater safety, and, second, greater durability—the first of which is obtained by the use of flanged bushing-faces and the second by making said bushing of anti-friction metal.

The safety feature might be obtained by making the bushings of any kind of metal as well as of brass; but the same degree of durability would not be secured, for in this case all of the rubbing-surfaces are between iron and brass, making the parts much less liable to cut than if made of iron.

The sockets or tubular projections made on the outside of the bushing-pieces may be made square, or may be made to project through the jaw and be secured with a nut, or a thread may be cut in them and the bolt screwed through, or the bushing-pieces may be made of soft malleable iron and lined with brass or copper; but all such modifications would involve the same general principle of construction, and therefore fall within the scope of my invention, as I do not intend to confine my claim to the use of any particular kind of material or shape in construction; but

What I claim, and desire to secure by Letters Patent, is—

1. The use of the anti-friction facings or bushing-pieces e e, as described, in combination with the head of the thill-shank and the jaws of the lug, to increase the extent and durability of the rubbing-surface.

2. Coupling the head of the thill-shank in the jaws of the lugs by the use of bushing-pieces e e, so made and arranged in respect to said jaws and said head that said head will act as a key to secure said bushing-pieces, while at the same time said bushing-pieces act as a coupling to unite the thills to the axle without the aid of a bolt.

3. The use of bushing-pieces e e, made with a flange on their inside surfaces to lap over and hold the ends of the thill-shank, and a tubular socket or projection on their outside surface, to fasten in the jaws of the lugs and to receive the bolt, substantially as described.

JOHN McDERMOTT.

Witnesses:
AMOS BROADNAX,
PETER D. KENNY.